Jan. 31, 1961 A. VELAVICIUS 2,970,006
TAIL GATE WINDOW REGULATOR LOCK-OUT
Filed Sept. 8, 1959 2 Sheets-Sheet 1
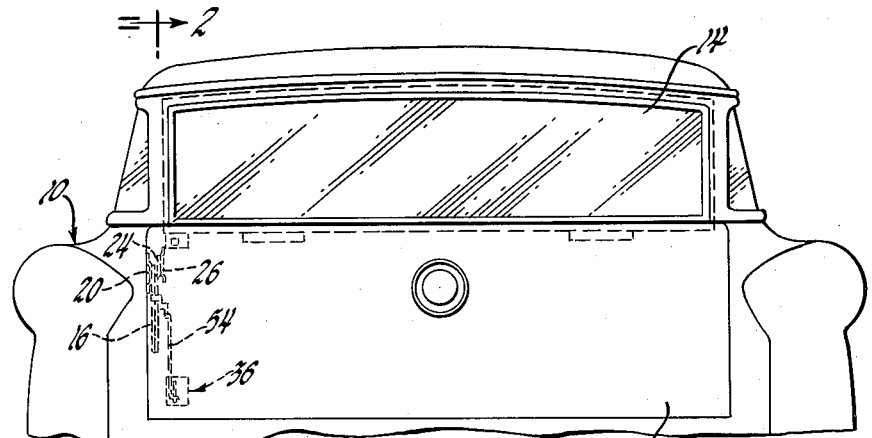
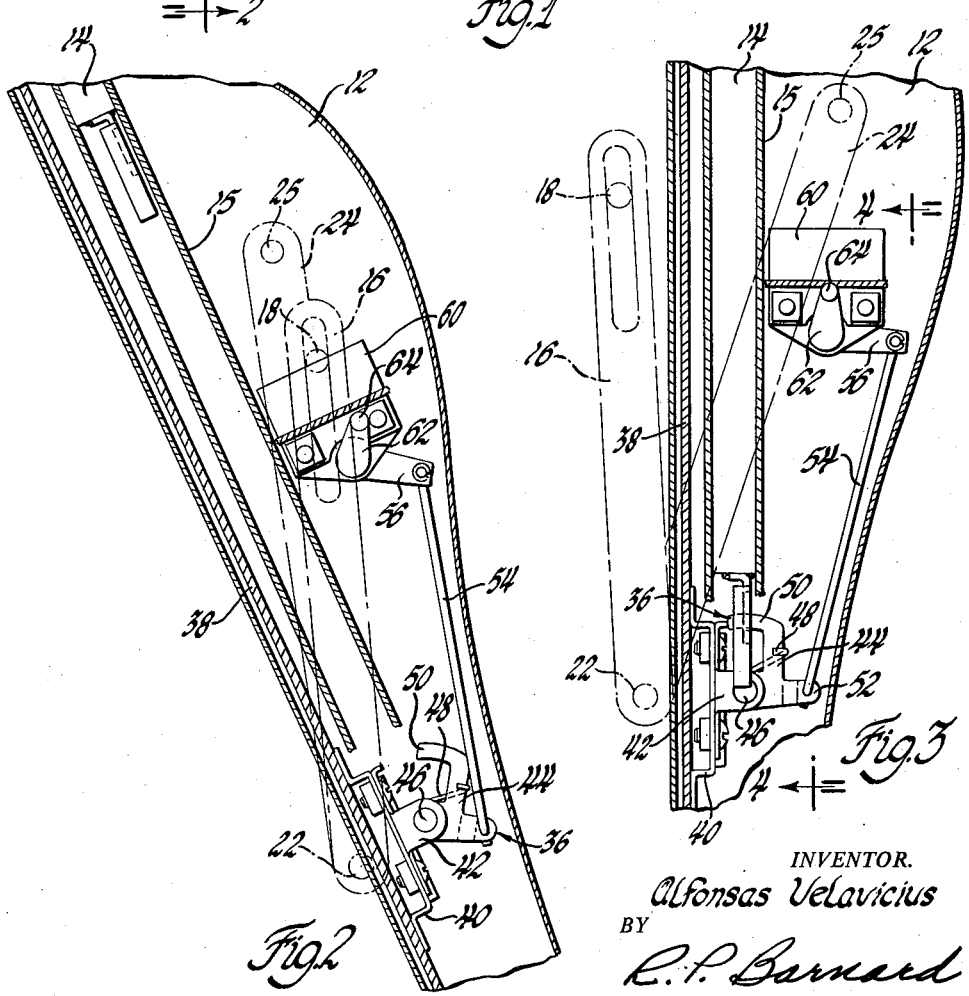
INVENTOR.
Alfonsas Velavicius
BY
R. P. Barnard
ATTORNEY

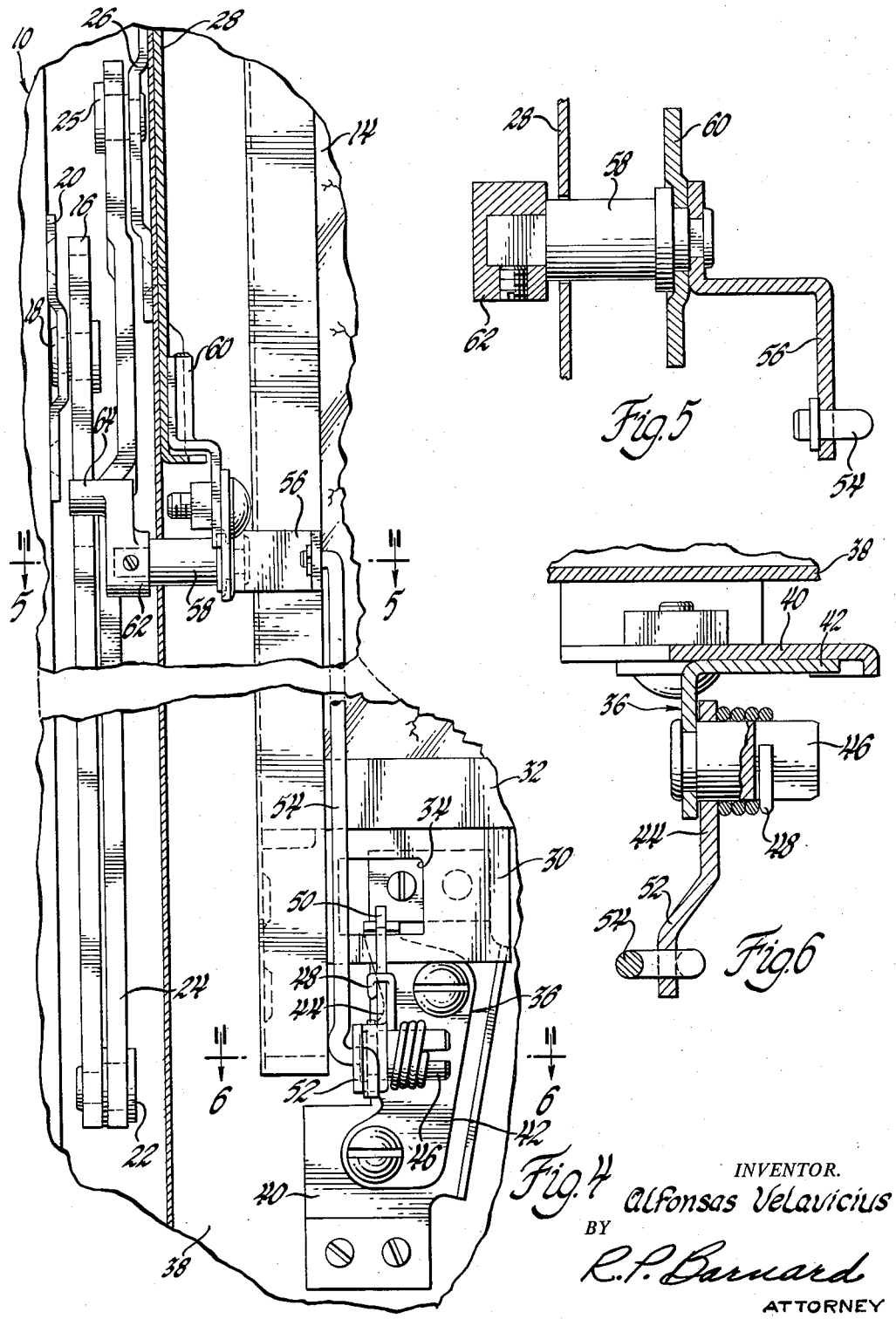

United States Patent Office 2,970,006
Patented Jan. 31, 1961

2,970,006

TAIL GATE WINDOW REGULATOR LOCK-OUT

Alfonsas Velavicius, Detroit, Mich., assignor to General Motors Corporation, Detroit, Mich., a corporation of Delaware Filed Sept. 8, 1959, Ser. No. 838,586

5 Claims. (Cl. 296—106)

The present invention relates to a tail gate window regulator lock-out mechanism which prevents a tail gate mounted window from being opened when the tail gate is open.

With the development of station wagon tail gates in which the former upper tail gate members have been replaced by a roll down window mounted in a lower tail gate, it becomes important to be sure that the roll down window is not rolled up when the tail gate is in its lowered or horizontal position. It is apparent why this should not occur inasmuch as the window is relatively unsupported when in its up position and hence likely to break if any loading pressure is applied thereto. The present invention relates to a mechanism whereby the tail gate window is locked in its roll down position when the tail gate is open.

More specifically the present invention includes a striker member mounted on the lower portion of the tail gate window and which striker is adapted to be engaged by a latch member mounted on the tail gate and which latch is in turn controlled by the tail gate linkage.

The details as well as other objects and advantages of the present invention will be apparent from a perusal of the detailed description which follows.

In the drawings:

Figure 1 shows a station wagon tail gate embodying the subject invention;

Figure 2 is a view along line 2—2 of Figure 1;

Figure 3 shows the tail gate of Figure 2 moving in an opening direction;

Figure 4 is a view along line 4—4 of Figure 3;

Figure 5 is a view along line 5—5 of Figure 4; and

Figure 6 is a view along line 6—6 of Figure 4.

A vehicle of the station wagon type is indicated generally at 10 and includes a lower tail gate member 12 pivotally mounted along its lower edge in any conventional manner to an access opening within the vehicle body. A roll down window 14 is slidably mounted in tail gate tracks 15 and adapted to be raised or lowered either manually or automatically in any well known manner.

The open position of tail gate 12 is controlled by linkage mechanism disposed at either side thereof and connected between the vehicle body and the tail gate. Inasmuch as the linkage mechanisms are identical only one need be described in detail. Each linkage mechanism includes a first link member 16 pivotally connected through a pin 18 to a bracket 20 mounted on body 10 and which link is articulated at its lower end through a pin 22 to another link 24. Link 24 is in turn connected at its upper end, as viewed in Figure 4, through a pin 25 to a bracket 26 fixed to tail gate side wall 28. Thus when tail gate 12 is moved from a closed to a horizontal position, links 16 and 24 will be fully extended to limit further opening movement.

Referring particularly to Figures 3 and 4, it will be seen that a plate 30 is mounted in the lower left corner of window frame 32. Plate 30 includes an opening 34 therein. A latch mechanism is indicated generally at 36 and is mounted on inner wall 38 of the tail gate. Mechanism 36 is adapted to coact with window plate 30 only when the window is in its rolled down or lowermost position as indicated in Figures 3 and 4.

Latch mechanism 36 includes a first bracket member 40 mounted on tail gate wall 38 and to which bracket a trunnion 42 is mounted. Trunnion 42 is adapted to pivotally support a latch member 44 through a pin 46. Latch member 44 is biased in a counterclockwise or latching direction by a coiled spring 48 wound around and anchored at one end to pin 46. Latch member 44 includes a first arm 50 adapted to project through window plate opening 34 when window 14 is in its rolled down position. Latch member 44 includes a second arm 52 having one end of a rod 54 articulated thereto. The other end of rod 54 is articulated to a lever 56 fixed to a shaft 58. Shaft 58 is pivotally mounted in a bracket 60 fixed to body wall 28 and which shaft extends through said body wall and terminally supports a bell crank lever 62 fixed thereto.

Bell crank lever 62 terminates in a transversely extending stud portion 64 which is adapted to be engaged by link 16. As best seen in Figure 2, when the tail gate 12 is in a closed position, link 16 has engaged stud 64 of bell crank lever 62 to rotate the latter in a clockwise direction and thereby imparting a similar rotative movement to latch member 44. Under these conditions window 14 must be moved to its rolled down position before tail gate 12 can be opened. When the window is moved to its lowermost or rolled down position, as seen in Figure 3, and tail gate 12 is rotated in a clockwise or opening direction, bell crank lever stud 64 is moved away from link 16 permitting coil spring 48 to rotate latch member 44 into window plate opening 34. Under these conditions the window is latched or locked in its rolled down position and cannot be moved to its uppermost or rolled up position until such time as tail gate 12 is rotated back to its closed position as shown in Figure 2.

Thus a window lock-out mechanism is provided which prevents the tail gate window from being rolled up when the tail gate is in an open position.

I claim:

1. A vehicle including an access opening, a tail gate pivotally mounted in said opening and adapted to close the lower portion thereof, a window slidably mounted within said tail gate member and adapted in its rolled up position to close the upper portion of said opening, a linkage mechanism adapted to limit the opening movement of said tail gate member, and a mechanism mounted on said tail gate and adapted to coact with said window to lock the same in a rolled down position when said tail gate is open, said mechanism including a striker member mounted on said window, a latch device mounted on the tail gate and including a latch member rotatably mounted on the tail gate, spring means adapted to bias the latch member into engagement with said striker member when the window is in its roll down position and the tail gate at least partially opened, lever means operatively connected to said rotatable latch member and adapted to coact with said tail gate linkage mechanism to move said latch member out of operative engagement with said striker when said tail gate is in a closed position.

2. A vehicle including an access opening, a tail gate member pivotally mounted on said vehicle and adapted to close the lower portion of said opening, a window slidably mounted within said tail gate member and adapted to close the upper portion of said opening, a first link articulated at one end to said vehicle body, a second link articulated at one end to said tail gate, the other ends of said links being articulated to each other and adapted to limit the opening movement of said tail gate, a striker member mounted on said window, a latch member pivotally mounted on said tail gate, means for resiliently biasing said latch member into engagement with said striker member to retain said window in a rolled down position, a control rod articulated at one end to said latch member, the other end of said rod member being articulated to a lever means, said lever means being adapted to engage said first link to rotate said latch member out of engagement with said striker when the tail gate is in a closed position.

3. A vehicle as set forth in claim 1 in which said latch member includes a first arm adapted to engage the striker member, a second arm connected with the lever means.

4. A vehicle as set forth in claim 2 in which the striker plate includes an opening, the latch member including a first arm adapted to coact with the striker opening to lock said window when in its lowered position, the latch member including a second arm articulated to the control rod.

5. A vehicle as set forth in claim 2 in which the lever means comprises a bracket mounted on an end wall of the tail gate, a shaft pivotally mounted in the bracket, a first lever fixed to one end of said shaft and articulated to said rod, the other end of said shaft extending through an opening in the end wall, a second lever fixed to said other end of said shaft and adapted to coact with the first link.

References Cited in the file of this patent

UNITED STATES PATENTS 2,793,907   Hess et al. _____ May 28, 1957